J. M. DOOLITTLE.
LOCK NUT.
APPLICATION FILED JAN. 7, 1913.
1,080,199.
Patented Dec. 2, 1913.
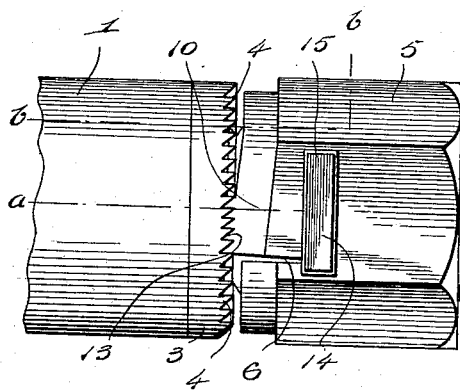
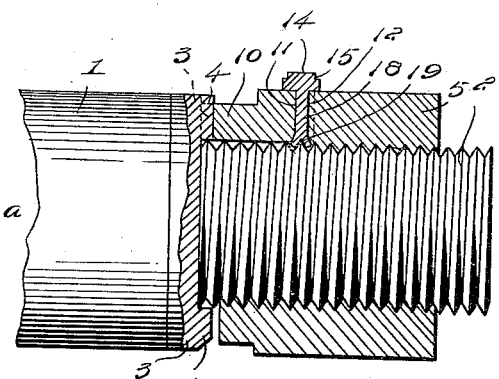
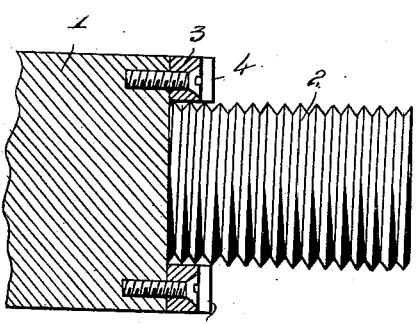
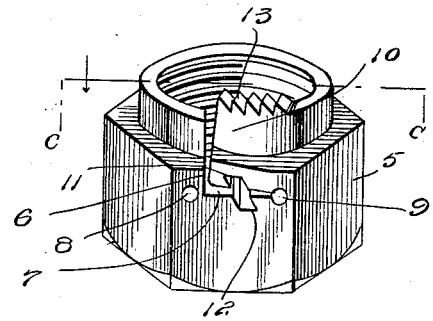
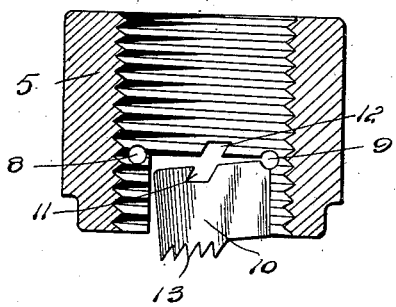
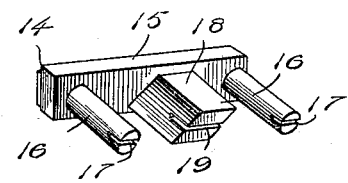
Inventor
J. M. Doolittle.
Witnesses
Chas. E. Kemper.
Carroll Bailey.
By Victor J. Evans.
Attorney

UNITED STATES PATENT OFFICE.

JACOB M. DOOLITTLE, OF NEW KENSINGTON, PENNSYLVANIA.

LOCK-NUT.

1,080,199.  Specification of Letters Patent.  Patented Dec. 2, 1913.

Application filed January 7, 1913. Serial No. 740,746.

*To all whom it may concern:*

Be it known that I, JACOB M. DOOLITTLE, a citizen of the United States, residing at New Kensington, in the county of Westmoreland and State of Pennsylvania, have invented new and useful Improvements in Lock-Nuts, of which the following is a specification.

The present invention relates to improvements in means for locking the nut upon a bolt to prevent the accidental separation of the nut from the bolt.

In carrying out my invention it is my purpose to provide either a shouldered bolt with a toothed disk or to attach the said toothed disk to a super-structure through which the bolt passes, and to provide a nut with a toothed resilient member which, when screwed home upon the bolt is adapted to co-act with the teeth of the disk and to retain the nut in locked position with relation to the bolt or to the super-structure.

I also aim to construct a nut from a piece of resilient material which shall be slitted, the portion below the slit being provided with teeth and adapted to exert a downward tension or a tension away from the body of the nut, and thus provide the nut with an integrally formed ratchet member which is adapted to co-act with teeth formed on the shoulder of a bolt.

It is a still further object of my invention to provide a bolt which shall have a shoulder provided with teeth, and a nut for the bolt, the said nut being slitted, and being provided at the ends of the slits with orifices which enter the bore of the nut as well as being formed centrally of the said slit with an angular recess which also enters the bore of the nut, the portion of the nut below the slit being adapted to exert a tension away from the body of the nut and to co-act with the teeth upon the shoulder of the bolt when the nut is screwed home upon the bolt, and further to provide the bolt with a locking member which shall have offset portions or fingers which enter the orifices and central opening of the nut and which is adapted to force the teeth of the lower portion provided by the slit tightly into engagement with the teeth upon the shoulder of the bolt, and furthermore to construct the projections of the wedge-member of some tenacious material so that the same, when forced into contact with the threads of the bolt, will spread, and thus serve as an additional means for preventing the accidental removal of the nut from the bolt.

With the above recited objects in view and others which will appear as the nature of the invention is more fully understood, the improvement resides in the construction, combination and operative arrangement of parts set forth in the following specification and falling within the scope of the appended claims.

In the drawing: Figure 1 is a view illustrating my improvement in applied position upon a shouldered bolt, Fig. 2 is a second view upon the line $a-a$ of Fig. 1, Fig. 3 is a detail sectional view upon the line $b-b$ of Fig. 1, Fig. 4 is a perspective view of the nut, Fig. 5 is a sectional view through the same, taken approximately upon the line $c-c$ and looking toward the arrows Fig. 6 is a perspective view of the wedge member or key.

In the drawings, like characters of reference designate corresponding parts throughout the several views.

While in the accompanying drawings I have illustrated my improvement in connection with a shouldered bolt, it is to be understood that the same is not to be thus limited in its useful application, as for instance, the washer may be applied to the super-structure of a building, and also the device may be employed with equal efficiency in connection with vehicle axles, or as a matter of fact upon any structure which is liable to vibration and where it is desirable or imperative that the nut shall not be accidentally removed from the bolt.

Referring now to the drawings in detail, the numeral 1 designates a bolt which is in the nature of a vehicle spindle and which has its end provided with a reduced threaded extension 2. The shoulder provided upon the end of the member 1 adjacent its threaded extension 2 may be formed with a plurality of peripheral indentations forming teeth, but, in the present instance, I have shown the member 1 provided with a removable disk 3, the outer edge of which is formed with teeth 4.

The numeral 5 designates the nut for the bolt. The nut 5 may be constructed of any suitable resilient material, such as steel, and the said nut is slitted longitudinally, as at 6, from its inner face, and from thence is slit or recessed at an angle to the slitted portion 6, as indicated by the numeral 7. The nut to one side of its longitudinal slit 6 is provided with an orifice 8 which enters the bore of the nut, and the slit 7 is intersected by an orifice 9 which also enters the bore of the nut. By slitting the nut as above described, it will be noted that the lower portion thus formed provides what may be termed a dog 10, the said dog being adapted to exert a pressure away from the main body of the nut. The dog 10 is provided with a notch 11, while the wall of the nut formed by the cut-away portion 7 is also provided with a notch or depression 12 which is arranged directly above the notch 11. The lower extremity of the dog 10, and adjacent what may be termed the outer end of the said dog is formed with teeth 13.

With a device, constructed as above described, it will be noted that when the nut is screwed home upon the bolt, the teeth 13 of the said nut will co-act with the teeth 4 of the washer 3, and the said teeth will firmly interlock to prevent the accidental separation of the nut from the bolt. Should it be desirable to separate the nut from the bolt, some sharp instrument must be employed for swinging the dog so that its teeth 13 will be brought out of engagement with the teeth 4.

In order to securely retain the teeth 13 into engagement with the teeth 4, I provide a spreading wedge member or key 14. This key is constructed from some malleable metal and embodies a head 15 which has its underface adjacent its ends formed with depending fingers 16 which have their extremities longitudinally slitted, as at 17. Intermediate of the fingers 16 of the plate 15 is provided an angularly arranged wedge member 18 which is also longitudinally slitted from its lower face, as at 19, the slitted portions of the fingers and the wedge member 18 being so arranged as to correspond with the bevel of the threads of the member 2 for a purpose which will presently be set forth. The fingers 16 are adapted to be inserted within the orifices 8 and 9, while the angular wedge member 18 is adapted to be received within the angular notches 11 and 12. The key, as well as the fingers 16, are of a length sufficient to enter the bore of the nut, and upon compression, the slitted ends of the fingers and key will engage with one of the threads of the member 2, which, through the medium of the slits or bifurcations provided in the ends of the said members will cause the same to spread and thus not only securely engage with the threads of the member 2 but the wedge 18 will force the dog 10 away from the body of the nut and its teeth 13 tightly into engagement with the teeth on the shoulder of the bolt.

When the improvement is employed in connection with wooden beams, a washer having teeth upon one of its faces and projecting studs upon the opposite face may be employed. The studs may be driven into the beams and the teeth of the washer may co-act with the inner face of the nut.

Having thus described the invention, what I claim is:

1. A bolt having a shoulder provided with teeth, a nut for the bolt, said nut being constructed of resilient material and being slitted longitudinally and transversely to provide a resilient dog, said dog being adapted to spread away from the nut proper and having its lower face formed with teeth, and the teeth of the dog adapted to coöperate with the teeth of the bolt when the nut is screwed home upon the bolt.

2. In combination with a bolt having a shoulder provided with teeth, of a nut constructed of resilient material and adapted to engage with the bolt, said nut being slitted upon its inner face longitudinally and transversely to provide a spring dog which exerts a tension away from the body of the nut, the said dog having its lower face provided with teeth which are adapted to co-act with the teeth of the bolt when the nut is screwed upon the bolt, and a locking member for retaining the teeth of the dog into engagement with the teeth of the bolt.

3. In combination with a shouldered bolt, of a washer having its outer face provided with teeth removably connected with the shoulder, a nut for the bolt, said nut being slitted longitudinally and transversely to provide a resilient dog which exerts a tension away from the body of the nut, the said dog having its underface formed with teeth, the nut being provided with orifices which enter the bore thereof, the nut and dog having notches which are arranged opposite each other and which enter the bore of the nut, the teeth of the dog adapted to engage with the teeth of the washer when the nut is screwed home upon the bolt, and a key member including malleable fingers which are adapted to enter the orifices of the nut and a malleable wedge member which is adapted to enter the notches of the nut and dog, and the said fingers and wedge adapted upon inward pressure to be spread and to be tightly engaged with one of the threads of the bolt and the wedge member also adapted to force the dog away from the body of the bolt and the teeth thereof more securely into engagement with the teeth of the washer.

In testimony whereof I affix my signature in presence of two witnesses.

JACOB M. DOOLITTLE.

Witnesses:
E. E. PATTON,
M. J. McGEARY.